(12) United States Patent
Yamashita

(10) Patent No.: US 9,014,962 B2
(45) Date of Patent: Apr. 21, 2015

(54) ELECTRIC-VEHICLE CONTROL DEVICE

(75) Inventor: Yoshinori Yamashita, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/371,268

(22) PCT Filed: Jan. 12, 2012

(86) PCT No.: PCT/JP2012/050507
§ 371 (c)(1),
(2), (4) Date: Jul. 9, 2014

(87) PCT Pub. No.: WO2013/105248
PCT Pub. Date: Jul. 18, 2013

(65) Prior Publication Data

US 2014/0350765 A1 Nov. 27, 2014

(51) Int. Cl.
*B60L 7/18* (2006.01)
*B60L 7/14* (2006.01)
(Continued)

(52) U.S. Cl.
CPC ... *B60L 7/18* (2013.01); *B60L 7/14* (2013.01); *B60L 9/18* (2013.01); *B60L 15/025* (2013.01);
(Continued)

(58) Field of Classification Search
CPC ......... B60L 7/18; B60L 11/1851; B60L 7/14; B60L 9/18; B60L 15/025; B60L 15/2009; B60L 2240/421; B60L 2240/423; B60L 2270/145; Y02T 10/643
USPC .......................................................... 701/22
See application file for complete search history.

(56) References Cited

U.S. PATENT DOCUMENTS

2006/0290318 A1* 12/2006 Toda et al. ..................... 318/801
2007/0002995 A1* 1/2007 Hemmi et al. ................ 375/377
(Continued)

FOREIGN PATENT DOCUMENTS

JP 59-209003 A 11/1984
JP 60-223402 A 11/1985
(Continued)

OTHER PUBLICATIONS

International Search Report (PCT/ISA/210) mailed on Apr. 17, 2012, by the Japanese Patent Office as the International Searching Authority for International Application No. PCT/JP2012/050507.
(Continued)

*Primary Examiner* — James Trammell
*Assistant Examiner* — Frederick Brushaber
(74) *Attorney, Agent, or Firm* — Buchanan Ingersoll & Rooney PC

(57) ABSTRACT

An electric-vehicle control device includes a light-load-regeneration control operation unit performing a control operation for returning, to an overhead wire, regenerative power generated by a motor driven by an inverter that converts voltage of a filter capacitor, which accumulates electric power supplied from the overhead wire, into desired alternating-current voltage. The light-load-regeneration control operation unit includes a proportional control system calculating, based on a filter capacitor voltage EFC, VECESL for suppressing regenerative torque of the motor and a regenerative-power control system calculating, based on regenerative power, which is calculated using an overhead wire voltage ES and an overhead wire current IS, and a torque pattern PTRN serving as a torque command, WEFCLMP for suppressing the regenerative torque of the motor, and the regenerative torque of the motor is controlled using output of the sum of VECESL and WEFCLMP as a torque control amount (a torque reduction amount).

7 Claims, 3 Drawing Sheets

(51) Int. Cl.
 *B60L 9/18* (2006.01)
 *B60L 15/02* (2006.01)
 *B60L 15/20* (2006.01)
(52) U.S. Cl.
 CPC ....... *B60L 15/2009* (2013.01); *B60L 2240/421* (2013.01); *B60L 2240/423* (2013.01); *B60L 2270/145* (2013.01); *Y02T 10/643* (2013.01)

(56) References Cited

U.S. PATENT DOCUMENTS

| | | |
|---|---|---|
| 2008/0004760 A1* | 1/2008 | Sogihara .......................... 701/22 |
| 2009/0322148 A1* | 12/2009 | Kitanaka ........................ 307/9.1 |
| 2010/0060212 A1* | 3/2010 | Negoro et al. ............. 318/400.3 |
| 2011/0043038 A1* | 2/2011 | Tsutsumi et al. ................ 307/48 |
| 2012/0086369 A1* | 4/2012 | Kitanaka et al. .............. 318/139 |
| 2012/0112669 A1* | 5/2012 | Kitanaka .......................... 318/3 |
| 2012/0227616 A1* | 9/2012 | Kusano ........................... 105/61 |
| 2013/0063055 A1* | 3/2013 | Araki et al. .................... 318/376 |
| 2013/0113279 A1* | 5/2013 | Hatanaka ....................... 307/9.1 |
| 2014/0350765 A1* | 11/2014 | Yamashita ...................... 701/22 |

FOREIGN PATENT DOCUMENTS

| | | |
|---|---|---|
| JP | 63-277402 A | 11/1988 |
| JP | 9-023506 A | 1/1997 |
| JP | 9-215105 A | 8/1997 |
| JP | 2001-169403 A | 6/2001 |
| JP | 2004-088974 A | 3/2004 |
| JP | 2008-005620 A | 1/2008 |
| JP | 2011-010506 A | 1/2011 |

OTHER PUBLICATIONS

Written Opinion (PCT/ISA/237) mailed on Apr. 17, 2012, by the Japanese Patent Office as the International Searching Authority for International Application No. PCT/JP2012/050507.

* cited by examiner

US 9,014,962 B2

ELECTRIC-VEHICLE CONTROL DEVICE

FIELD

The present invention relates to an electric-vehicle control device.

BACKGROUND

As a conventional electric-vehicle control device, for example, an electric-vehicle control device disclosed in Patent Literature 1 described below fetches only a filter capacitor voltage into a light-load-regeneration control operation unit and determines a control amount in comparison with a voltage target value.

CITATION LIST

Patent Literature

Patent Literature 1: Japanese Patent Application Laid-Open No. H9-215105

SUMMARY

Technical Problem

However, in the conventional configuration disclosed in Patent Literature 1 described above, depending on a method of setting a control constant for causing regeneration to effectively act, a control system tends to be unstable. If the control system is unstable, torque fluctuation sometimes occurs. Therefore, there is a problem in that the ride becomes less comfortable.

Depending on voltage setting in a substation and an operation situation of other train formations present in the same power feeding section, an overhead wire voltage itself rises and a filter capacitor voltage also rises. Therefore, in the conventional control system that uses only the filter capacitor voltage, there is a problem in that, although a regenerative load is present, regenerative torque is reduced according to a voltage condition and the regenerative ratio is sometimes deteriorated.

The present invention has been devised in view of the above and it is an object of the present invention to provide an electric-vehicle control device that enables the regenerative ratio to be further improved while preventing the ride to becomes less comfortable.

Solution to Problem

In order to solve the above problems and achieve the object, an electric-vehicle control device according to the present invention is an electric-vehicle control device that includes a power converter that converts a direct-current voltage of a filter capacitor, which accumulates electric power supplied from an overhead wire, into a desired alternating-current voltage and drives a motor, which is a load; a control unit that controls the power converter; and a regeneration control operation unit that performs a control operation for returning regenerative power generated by the motor to the overhead wire, wherein the regeneration control operation unit includes: a first control system that calculates, on a basis of a voltage of the overhead wire or the filter capacitor, a first torque suppression amount for suppressing regenerative torque of the motor; and a second control system that calculates, on a basis of regenerative power that is calculated using a voltage of any of the overhead wire and the filter capacitor and an electric current flowing to the overhead wire, and a torque command, a second torque suppression amount for suppressing regenerative torque of the motor, and regenerative torque of the motor is controlled on a basis of the first torque suppression amount and the second torque suppression amount.

Advantageous Effects of Invention

With the electric-vehicle control device according to the present invention, an effect is obtained where the regenerative ratio can be further improved without causing the ride to become less comfortable.

DESCRIPTION OF EMBODIMENTS

Electric-vehicle control devices according to embodiments of the present invention are explained below with reference to the accompanying drawings. Note that the present invention is not limited by the embodiments explained below.

First Embodiment

Figure 1:
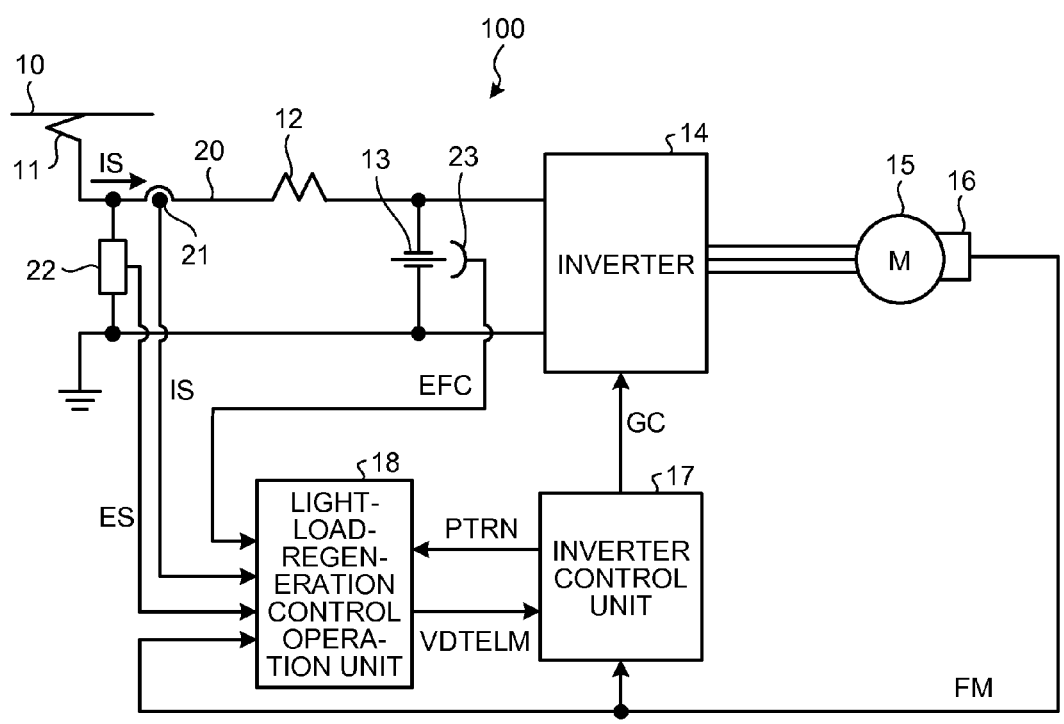
FIG. 1 is a diagram of the configuration of an electric vehicle including an electric-vehicle control device according to a first embodiment.

FIG. 1 is a diagram of the configuration of an electric vehicle including an electric-vehicle control device according to a first embodiment of the present invention. In FIG. 1, an electric vehicle 100 includes, as main components (main circuit units) related to the electric-vehicle control device, a pantograph 11 functioning as a current collector that slides on an overhead wire 10, which supplies direct-current power, to thereby transfer the direct-current power to and from the overhead wire 10, a direct-current reactor 12 inserted into a direct-current bus 20 that extends from the pantograph 11 to the main circuit units side, a filter capacitor 13 that smoothes and accumulates the direct-current power (charges) supplied via the pantograph 11 and the direct-current reactor 12, and an inverter 14 functioning as a power converter that converts a direct-current voltage of the filter capacitor 13 into a desired alternating-current voltage and drives a motor 15, which is a load.

The electric vehicle 100 includes, as various sensors, a current detector 21 that detects an electric current flowing into the electric vehicle 100 from the overhead wire 10 or an electric current (hereinafter referred to as "overhead wire current") IS flowing out from the electric vehicle 100 to the overhead wire 10, a voltage detector 22 that detects a voltage (hereinafter referred to as "overhead wire voltage") ES of the pantograph 11 serving as a voltage of a direct-current power supply, a voltage detector 23 that detects a voltage (a filter capacitor voltage) EFC of the filter capacitor 13, and a speed detector 16 that detects or calculates angular velocity ω of the motor 15 as speed information.

Further, the electric vehicle 100 includes an inverter control unit 17 that controls the operation of the inverter 14 and a light-load-regeneration control operation unit 18 that performs a control operation (so-called light-load-regeneration control operation) for effectively or efficiently returning regenerative power generated by the motor 15 to the overhead wire 10 side. Although details are explained below, the light-load-regeneration control operation unit 18 generates a torque suppression amount VDTELM, which is a reduction amount of regenerative torque, on the basis of the overhead wire voltage ES, the overhead wire current IS, the filter capacitor voltage EFC, the angular velocity ω of the motor 15, and a torque pattern (a torque command) PTRN output from the inverter control unit 17 and outputs the torque suppression amount VDTELM to the inverter control unit 17.

The inverter control unit 17 generates, on the basis of the torque suppression amount VDTELM generated by the light-load-regeneration control operation unit 18, a control signal GC for subjecting the switching element (not shown in the figure) provided in the inverter 14 to ON/OFF control and outputs the control signal GC to the inverter 14. Note that the torque pattern PTRN is obtained by patterning a torque command amount (the magnitude of a torque command) corresponding to the magnitude of a brake command, speed V of the electric vehicle 100, and the like. The torque pattern PTRN can be formed in a table format and retained in a processing unit or can be calculated by a function calculation.

Figure 2:
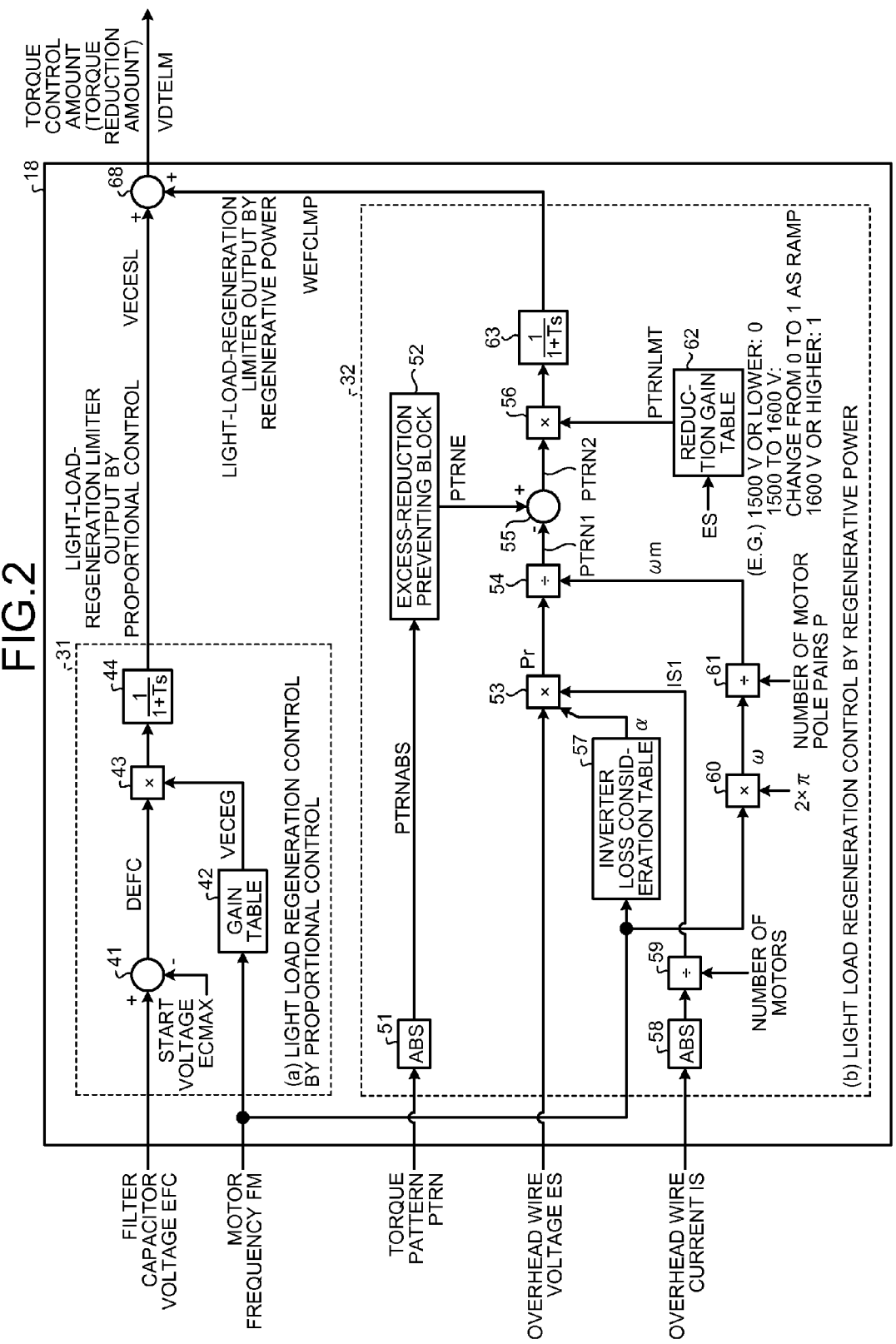
FIG. 2 is a diagram of a detailed configuration example of a light-load-regeneration control operation unit.

Details of the light-load-regeneration control operation unit 18 are explained. FIG. 2 is a diagram of a detailed configuration example of the light-load-regeneration control operation unit 18.

The light-load-regeneration control operation unit 18 includes, as shown in FIG. 2, a light-load-regeneration control system by proportional control ((a) in FIG. 2; hereinafter simply referred to as "proportional control system" or referred to as "first control system" according to the needs) 31 and a light-load-regeneration control system by regenerative power ((b) in FIG. 2; hereinafter simply referred to as "regenerative-power control system" or referred to as "second control system" according to the needs) 32. The light-load-regeneration control operation unit 18 is configured to sum, in an adder 68, the output of the proportional control system 31 and the output of the regenerative-power control system 32 and output the sum value of the outputs as the torque suppression amount VDTELM (a first torque suppression amount).

As shown in FIG. 2(*a*), the proportional control system 31 is configured to include a subtractor 41, a gain table 42, a multiplier 43, and a first-order-lag control block 44. In the subtractor 41, a voltage deviation DEFC obtained by subtracting a start voltage (a reference voltage) ECMAX from a filter capacitor voltage EFC is calculated. In the gain table 42, a multiplication coefficient VECEG given to the multiplier 43 is calculated using a motor frequency FM. The voltage deviation DEFC passes through the first-order-lag control block 44 after being multiplied by the multiplication coefficient VECEG by the multiplier 43 and is output to the adder 68 as a light-load-regeneration limiter output VECESL by proportional control.

Note that, in the proportional control system 31, an amount obtained by multiplying the voltage deviation DEFC, which is an output of the subtractor 41, by the multiplication coefficient VECEG is a control amount, that is, one component of a torque suppression amount. Therefore, the proportional control system 31 operates as a control system relatively fast in response.

On the other hand, as shown in FIG. 2(*b*), the regenerative-power control system 32 is configured to include absolute-value calculating units 51 and 58, an excess-reduction preventing block 52, multipliers 53, 56, and 60, dividers 54, 59, and 61, a subtractor 55, an inverter loss consideration table 57, a reduction gain table 62, and a first-order-lag control block 63.

In the multiplier 53, the overhead wire voltage ES, an output IS1 of the divider 59, and an output α of the inverter loss consideration table 57 are multiplied together. The output IS1 of the divider 59 is obtained by dividing the absolute value of the overhead wire current IS by the number of motors and is therefore a current value flowing per motor. The inverter loss consideration table 57 is a table that decides a loss consideration gain α (e.g., about 1.02 to 1.05) taking into account a loss of the inverter 14 so that the loss can be added taking into account the efficiency of 95 to 98% of the inverter 14. The efficiency of the inverter 14 fluctuates depending on the rotation of the motor 15. Therefore, in this embodiment, the loss consideration gain α is determined according to the motor frequency FM.

In the divider 54, an output Pr of the multiplier 53 is divided by an output ωm of the divider 61. The output ωm of the divider 61 is obtained by dividing the angular velocity ω (=2π×FM: electrical angular velocity) of the motor 15, which is an output of the multiplier 60, by the number of motor pole pairs P and is mechanical angular velocity ωm of the motor 15. Therefore, an output PTRN1 of the divider 54 is regenerative torque per motor. In the subtractor 55, the output PTRN1 of the divider 54 is subtracted from an output PTRNE of the excess-reduction preventing block 52. Note that the output PTRNE of the excess-reduction preventing block 52 is generated on the basis of an absolute value PTRNABS of the torque pattern PTRN calculated by the absolute-value calculating unit 51.

An output PTRN2 of the subtractor 55 is input to the multiplier 56. The output PTRN2 passes through the first-order-lag control block 63 after being multiplied by a reduction gain PTRNLMT, which is an output of the reduction gain table 62, in the multiplier 56, and is output to the adder 68 as a light-load-regeneration limiter output WEFCLMP (a second torque suppression amount) by regenerative power.

Not that the regenerative-power control system 32 performs processing for repeating the multiplications and the divisions explained above several times and performs processing by the gain table 42, the inverter loss consideration table 57, and the reduction gain table 62. Therefore, the response speed of the control system is not high compared with the proportional control system 31. However, the light-load-regeneration control operation unit 18 in the present embodiment is configured to sum, in the adder 68, the output of the proportional control system 31 with high response speed, which performs regenerative torque control using a deviation between the filter capacitor voltage EFC and the reference voltage as a control amount, and the output of the regenerative-power control system 32 with low response speed, which performs the regenerative torque control using regenerative power as a control amount, and output the sum value of the outputs as the torque suppression amount VDTELM. Therefore, with the use of the electric-vehicle control device in the present embodiment, it is possible to perform reduction of regenerative torque accurately and in a timely manner.

The reduction gain table 62 is explained. The reduction gain table 62 outputs, in a region equal to or lower than the rated overhead wire voltage, the reduction gain PTRNLMT for suppressing unnecessary reduction. For example, as shown in FIG. 2, when the rated voltage of the overhead wire 10 (the rated overhead wire voltage) is 1500 volts, the reduction gain table 62 outputs PTRNLMT=0 when the overhead wire voltage ES is equal to or lower than 1500 volts and outputs PTRNLMT=1 when the overhead wire voltage ES is equal to or higher than 1600 volts. When the overhead wire voltage ES is in a range of 1500 volts to 1600 volts, the reduction gain table 62 outputs a real value that changes as a ramp from 0 to 1. If such a reduction gain table 62 is used, when the overhead wire voltage ES is higher than a predetermined value, it is possible to operate such that the reduction gain fully acts. When the overhead wire voltage ES is lower than the predetermined value, the reduction gain is gradually reduced according to a decrease in the overhead wire voltage ES. When the overhead wire voltage ES is lower than the rated voltage, the reduction gain is set to zero. Consequently, it is possible to gradually reduce a torque suppression amount, which is a reduction amount of regenerative torque, according to a decrease in the overhead wire voltage ES. Note that, in this configuration, the filter capacitor voltage EFC can be input instead of the overhead wire voltage ES.

Figure 3:
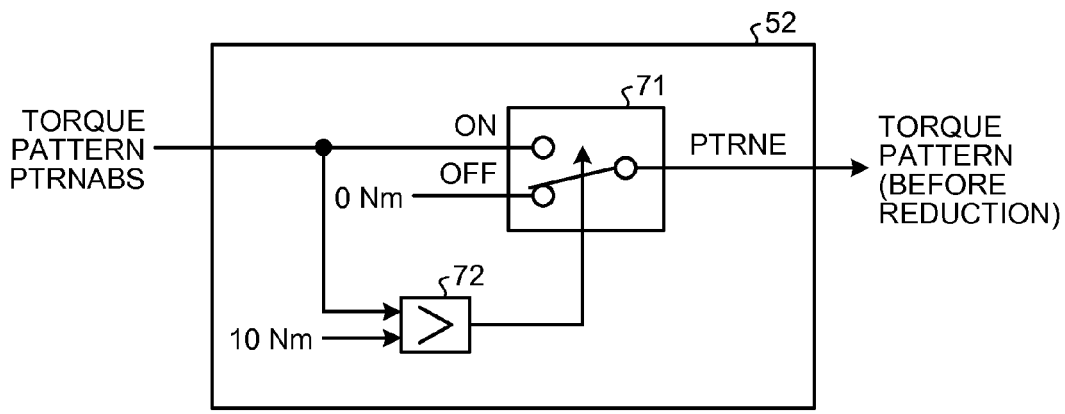
FIG. 3 is a diagram of a detailed configuration example of an excess-reduction preventing block.

The excess-reduction preventing block 52 is explained. FIG. 3 is a diagram of a detailed configuration example of the excess-reduction preventing block 52. The excess-reduction preventing block 52 includes, as shown in FIG. 3, a one-circuit two-contact input switch 71 and a comparator 72. In the comparator 72, the absolute value PTRNABS of the torque pattern (hereinafter simply referred to as "torque pattern PTRNABS") is compared with a first predetermined value (in the example shown in FIG. 3, 10 Nm). When the torque pattern PTRNABS is smaller than the first predetermined value, the switching contact is controlled to an "OFF" side. When the torque pattern PTRNABS is larger than the first predetermined value, the switching contact is controlled to an "ON" side. That is, in terms of the operation of the entire excess-reduction preventing block 52, during rising of the torque pattern PTRNABS, until the torque pattern PTRNABS reaches the first predetermined value (10 Nm), the torque pattern PTRNE is fixed to a second predetermined value (in the example shown in FIG. 3, 0 Nm) smaller than the first predetermined value regardless of the value of the torque pattern PTRNABS. On the other hand, when the torque pattern PTRNABS exceeds the first predetermined value (10 Nm), the value of the torque pattern PTRNABS is output as the torque pattern PTRNE. Note that the first and second predetermined values shown in FIG. 3 are examples. It goes without saying that other values can be used.

The regenerative-power control system 32 is a control system that detects regenerative power and operates. Therefore, the regenerative power cannot be detected unless the overhead wire current IS is flowing. Meanwhile, as explained above, in the excess-reduction preventing block 52, during rising of the torque pattern PTRNABS (i.e., during a regeneration start), the value of the torque pattern PTRNE output to the subtractor 55 is suppressed to "0". Therefore, excessive reduction during the regeneration start is suppressed. In this way, when another electric vehicle functioning as a regenerative load is present, the excess-reduction preventing block 52 can surely and smoothly detect regenerative power (current) during the regeneration start. When another electric vehicle functioning as a regeneration load is present, the excess-reduction preventing block 52 can grasp, in a timely manner, regenerative power required by the electric vehicle.

Note that, in the configuration explained in this embodiment, the filter capacitor voltage EFC is used as an input to the proportional control system 31. However, the overhead wire voltage ES can be used instead of the filter capacitor voltage EFC. In the configuration explained in the present embodiment, the overhead wire voltage ES is used as an input to the regenerative-power control system 32. However, the filter capacitor voltage EFC can be used instead of the overhead wire voltage ES.

As explained above, with the electric-vehicle control device according to the first embodiment, the regenerative torque of the motor 15 is controlled on the basis of the light-load-regeneration limiter output VECESL serving as the first torque suppression amount for suppressing the regenerative torque of the motor 15 on the basis of the overhead wire voltage ES or the filter capacitor voltage EFC, and the light-load-regeneration limiter output WEFCLMP serving as the second torque suppression amount for suppressing the regenerative torque of the motor 15 on the basis of the regenerative power Pr calculated using the overhead wire current IS and a voltage of any one of the overhead wire voltage ES and the filter capacitor voltage EFC and on the basis of the torque pattern PTRN serving as the torque command. Therefore, an effect is obtained where it is possible to further improve the regenerative ratio.

The electric-vehicle control device according to the first embodiment is configured to generate a torque suppression amount (a torque reduction amount) of the entire control system on the basis of the output of the proportional control system 31 that generates the light-load-regeneration limiter output VECESL serving as the first torque suppression amount and the output of the regenerative-power control system 32 that generates the light-load-regeneration limiter output WEFCLMP serving as the second torque suppression amount. Therefore, an effect is obtained where it is possible to configure a stable control system and thus it is possible to prevent occurrence of torque fluctuation and prevent the ride from becoming less comfortable.

Second Embodiment

Figure 4:
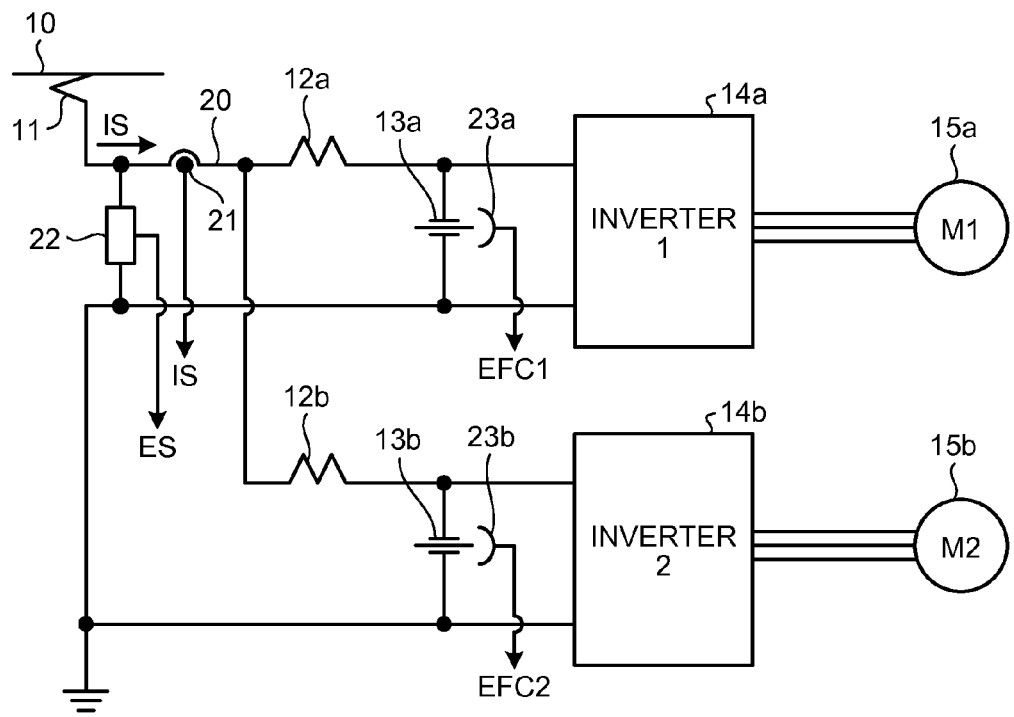
FIG. 4 is a diagram of the configuration of an electric vehicle according to a second embodiment.

FIG. 4 is a diagram of the configuration of an electric vehicle according to a second embodiment of the present invention. The electric-vehicle control device according to the first embodiment includes the light-load-regeneration control operation unit for each inverter. However, an electric-vehicle control device according to the second embodiment 2 is configured such that one light-load-regeneration control operation unit controls a plurality of inverters (in FIG. 4, two inverters are shown). Specifically, in the configuration shown in FIG. 4, with respect to the same direct-current bus 20, a first driving group including a direct-current reactor 12a, a filter capacitor 13a, an inverter 14a, a motor 15a, and a voltage detector 23a that detects a voltage (a filter capacitor voltage) EFC1 of the filter capacitor 13a and a second driving group including a direct-current reactor 12b, a filter capacitor 13b, an inverter 14b, a motor 15b, and a voltage detector 23b that detects a voltage (a filter capacitor voltage) EFC2 of the filter capacitor 13b are formed. Note that other configurations are the same as those in the first embodiment shown in FIG. 1. The same components are denoted by the same reference numerals and signs and common explanation of the components is omitted. In FIG. 4, the inverter control unit 17 and the light-load-regeneration control operation unit 18 are not shown. However, an input form of a sensor signal and an input and output form of a control signal are also the same as or equivalent to those in the first embodiment.

In the configuration shown in FIG. 4, the sum of the electric current flowing to the motor 15a and the electric current flowing to the motor 15b is the overhead wire current IS. Therefore, even if only one current detector 21 is present, it is possible to perform a light-load-regeneration control operation same as that in the first embodiment.

As explained above, in the electric-vehicle control device according to the second embodiment, when the electric vehicle is configured to drive a plurality of motors with a plurality of power converters, a regeneration control operation unit that is provided and shared by the power converters without corresponding to each power converter on a one-to-one basis calculates a torque suppression amount (first and second torque suppression amounts) of the entire electric vehicle on the basis of filter capacitor voltages corresponding to the power converters and a common overhead wire voltage and a common overhead wire current in the electric vehicle. Therefore, an effect is obtained where, even if the number of motors or the number of power converters increases, it is unnecessary to increase the number of current detectors, leading to a reduction in costs.

Third Embodiment

In the configuration explained in the first and second embodiments, the overhead wire current IS is obtained using the current detector 21. On the other hand, in a third embodiment, a configuration is explained in which the overhead wire current IS is obtained by calculation without using the current detector 21.

In the configuration shown in FIG. 1, as the inverter control unit 17 that controls the operation of the inverter 14, vector control is typically adopted that detects an electric current flowing to the phases of the motor 15, subjects the electric current to DQ conversion, and controls converted electric currents (a D-axis current and a Q-axis current) to coincide with current commands (a D-axis current command and a Q-axis current command). When the inverter control unit 17 is configured by such a vector control system, the overhead wire current IS can be calculated using the following formula without providing an overhead wire current detector.

$$IS=(I1QF \times E1QR + I1DF \times E1DR)/ES \quad (1)$$

In the above formula, ES represents overhead wire voltage, I1QF represents Q-axis current feedback, I1DF represents D-axis current feedback, E1QR represents Q-axis voltage command, and E1DR represents D-axis voltage command. Note that a filter capacitor voltage can be used instead of the overhead wire voltage.

The light-load-regeneration control operation unit 18 receives the overhead wire current IS calculated by the inverter control unit 17. The subsequent processing is as explained in the first embodiment. Note that, in a configuration including a plurality of driving groups like the configuration in the second embodiment, it is possible to calculate current values for the respective driving groups and calculate the sum of the current values as an overhead wire current.

As explained above, in the electric-vehicle control device according to the third embodiment, when the inverter control unit is configured to include the vector control system that detects an electric current flowing to the phases of a motor, subjects the electric current to DQ conversion, and controls such that a converted D-axis current and a converted Q-axis current respectively coincide with a D-axis current command and a Q-axis current command, which are current commands of the axes, the inverter control unit calculates an overhead wire current using the D-axis current, the Q-axis current, the D-axis current command, and the Q-axis current command, and the overhead wire voltage or the filter capacitor voltage. Therefore, an effect is obtained where it is unnecessary to provide a current detector that detects an overhead wire current, leading to a reduction in costs.

Note that the configurations explained in the first to third embodiments are examples of the configuration of the present invention. It goes without saying that the configurations can also be combined with other publicly-known technologies and can also be changed, for example, by omitting part thereof without departing from the scope of the present invention.

INDUSTRIAL APPLICABILITY

As explained above, the electric-vehicle control device according to the present invention is useful as an invention that enables the regenerative ratio to be further improved without causing the ride to become less comfortable.

REFERENCE SIGNS LIST

10 Overhead wire
11 Pantograph
12, 12a, 12b Direct-current reactor
13, 13a, 13b Filter capacitor
14, 14a, 14b Inverter
15, 15a, 15b Motor
16 Speed detector
17 Inverter control unit
18 Light-load-regeneration control operation unit
20 Direct-current bus
21 Current detector
22, 23, 23a, 23b Voltage detector
31 Proportional control system (light-load-regeneration control system by proportional control)
32 Regenerative-power control system (light-load-regeneration control system by regenerative power)
41, 55 Subtractor
42 Gain table
43, 53, 56, 60 Multiplier
44, 63 First-order-lag control block
51, 58 Absolute-value calculating unit
52 Excess-reduction preventing block
54, 59, 61 Divider
57 Inverter loss consideration table
62 Reduction gain table
68 Adder
71 Input switch
72 Comparator
VDTELM Torque suppression amount
VECESL Light-load-regeneration limiter output by proportional control
WEFCLMP Light-load-regeneration limiter output by regenerative power

The invention claimed is:

1. An electric-vehicle control device that includes a power converter that converts a direct-current voltage of a filter capacitor, which accumulates electric power supplied from an overhead wire, into a desired alternating-current voltage and drives a motor, which is a load; a control unit that controls the power converter; and a regeneration control operation unit that performs a control operation for returning regenerative power generated by the motor to the overhead wire, wherein the regeneration control operation unit includes:
a first control system that calculates, on a basis of a voltage of the overhead wire or the filter capacitor, a first torque suppression amount for suppressing regenerative torque of the motor; and
a second control system that calculates, on a basis of regenerative power that is calculated using a voltage of any of the overhead wire and the filter capacitor and an electric current flowing to the overhead wire, and a torque command, a second torque suppression amount for suppressing regenerative torque of the motor, and regenerative torque of the motor is controlled on a basis of the first torque suppression amount and the second torque suppression amount.

2. The electric-vehicle control device according to claim 1, wherein the second control system uses a difference value between the torque command and the regenerative power as a control amount used as a basis of the second torque suppression amount.

3. The electric-vehicle control device according to claim 2, wherein the second control system includes a control element that disables an input of the torque command during rising of the torque command.

4. The electric-vehicle control device according to claim 1, wherein the second control system includes a control element that adjusts, according to a voltage of the overhead wire or the filter capacitor, a control amount used as a basis of the second torque suppression amount.

5. The electric-vehicle control device according to claim 1, wherein the regenerative power is calculated taking into account a loss of the power converter.

6. The electric-vehicle control device according to claim 1, wherein, when an electric vehicle has a configuration in which a plurality of motors are driven with a plurality of power converters, a voltage detector that detects a voltage of the filter capacitor and the control unit are provided corresponding to each of the power converters on a one-on-one basis, the regeneration control operation unit, a voltage detector that detects a voltage of the overhead wire, and a current detector that detects an electric current flowing to the overhead wire are provided and shared by the power converters without corresponding to each of the power converters on a one-on-one basis, and the regeneration control operation unit calculates a torque suppression amount of a whole of the electric vehicle.

7. The electric-vehicle control device according to claim 1, wherein the control unit is configured to include a vector control system that detects an electric current flowing to phases of the motor, subjects the electric current to DQ conversion, and controls a D-axis current and a Q-axis current obtained by DQ conversion to respectively coincide with a D-axis current command and a Q-axis current command, which are current commands of axes, and the control unit calculates an electric current flowing to the overhead wire using the D-axis current, the Q-axis current, the D-axis current command, and the Q-axis current command and a voltage of the overhead wire or the filter capacitor.

\* \* \* \* \*